United States Patent
Ramfelt et al.

[11] Patent Number: 5,982,747
[45] Date of Patent: *Nov. 9, 1999

[54] METHOD FOR MANAGING FAILURES ON DYNAMIC SYNCHRONOUS TRANSFER MODE DUAL RING TOPOLOGIES

[75] Inventors: Lars Håkan Ramfelt, Palo Alto, Calif.; Lars Markus Hidell, Lindingö, Sweden

[73] Assignee: Dynarc Inc., Mountain View, Calif.

[*] Notice: This patent is subject to a terminal disclaimer.

[21] Appl. No.: 09/067,350

[22] Filed: Apr. 27, 1998

Related U.S. Application Data

[63] Continuation-in-part of application No. 08/757,347, Nov. 27, 1996, Pat. No. 5,838,687.

[30] Foreign Application Priority Data

Dec. 28, 1995 [SE] Sweden ................................ 9504679

[51] Int. Cl.$^6$ .............................. H04J 1/16; H04L 12/28
[52] U.S. Cl. ............................................ 370/224; 370/909
[58] Field of Search ................................ 370/216, 217, 370/222, 223, 224, 258, 280, 294, 376, 404, 405, 406, 460, 909

[56] References Cited

U.S. PATENT DOCUMENTS

| | | | |
|---|---|---|---|
| 4,542,502 | 9/1985 | Levinson et al. | 370/222 |
| 4,553,234 | 11/1985 | Brandsma et al. | |
| 4,587,651 | 5/1986 | Nelson et al. | 370/222 |
| 5,282,199 | 1/1994 | Herzberg et al. | 370/217 |
| 5,361,250 | 11/1994 | Nguyen et al. | 370/222 |
| 5,390,326 | 2/1995 | Shah | 370/222 |
| 5,550,805 | 8/1996 | Takatori et al. | 370/222 |
| 5,654,969 | 8/1997 | Wilhelmsson | 370/460 |

FOREIGN PATENT DOCUMENTS 0 451 426 B1  2/1994  European Pat. Off.

OTHER PUBLICATIONS

Article: The DTM Gigabit Network by Christer Bohm, Per Lindgren, Lars Ramfelt, Peter Sjodin; dated Jun. 17, 1993; pp. 1–20, 22–23.

Article: Fast Circuit Switching for the Next Generation of High Performance Networks; *IEEE Journal on Selected Areas in Communications*, vol. 14, No. 2, Feb. 1996, by Christer Bohm, Markus Hidell, Per Lindgren, Lars Ramfelt, and Peter Sjödin; pp. 298–305.

Article: Multi–gigabit networking based on DTM—A TDM medium access technique with dynamic bandwidth–allocation; *Computer Networks and ISDN Systems 24 (1992) 119–130 North Holland;* by Lars Gauffin, Lars Håkansson, and Björn Pehrson; pp. 119–130.

(List continued on next page.)

*Primary Examiner*—Huy D. Vu
*Assistant Examiner*—Chiho Andrew Lee
*Attorney, Agent, or Firm*—Fasth Law Offices; Rolf Fasth

[57] ABSTRACT

The dynamic synchronous transfer mode dual ring topology has two rings with opposite fiber directions. The dual rings may have a plurality of common nodes. A first channel may be established in a first segment extending between a first and second nodes. Tokens associated with the first channel may be provided. In this way, time slots may be transmitted in the first channel from the first node to the second node. If a fiber failure occurs in the first segment, the second node is likely to first detect the fiber failure and transmit a fiber failure message. It is then determined if the first channel extends across the fiber failure. If the first channel is affected by the fiber failure then a channel failure message is transmitted and the first channel is terminated and all the tokens associated with the first segment are removed. If the first channel is not affected then time slots are continued to be transmitted on the first channel.

20 Claims, 4 Drawing Sheets

OTHER PUBLICATIONS

Article: Incorporating continuation–of–message information, slot reuse, and fairness in DQDB networks; *Computer Networks and ISDN Systems 24* (1992) 153–169 North–Holland; by Subrata Banerjee and Biswanath Mukherjee; pp. 153–169.

Article: MetaRing—A Full–Duplex Ring with Fairness and Spatial Reuse; *IEEE Transactions on Communications*, vol. 41, No. 1, Jan. 1993; by Israel Cidon and Yoram Ofek; pp. 110–120.

Article: A Simple Scheme for Slot Reuse Without Latency for a Dual Bus Configuration; by Oran Sharon and Adrian Segall, 1993 IEEE, 9 pages.

Article: A Study of Slot Reuse in Dual Bus Multiple Access Networks by Mark W. Garrett and San–Qi Li; 1990 IEEE, pp. 617–629.

Article: L. Ramfelt; by Manoel A. Rodrigues, AT&T Bell Laboratories, Holmdel, NJ 07733; 1990 IEEE; pp. 636–643.

METHOD FOR MANAGING FAILURES ON DYNAMIC SYNCHRONOUS TRANSFER MODE DUAL RING TOPOLOGIES

PRIOR APPLICATION

This application is a continuation-in-part application of U.S. patent application Ser. No. 08/757,347; filed Nov. 27, 1996, now U.S. Pat. No. 5,838,687.

TECHNICAL FIELD

The present invention relates to a dynamic synchronous transfer mode (DTM) architecture in a circuit-switched network having at least one failure in a dual ring topology that operates in two opposite fiber directions.

BACKGROUND AND SUMMARY OF THE INVENTION

The next generation of networks are likely to integrate services such as delay-insensitive asynchronous applications including fax, mail, and file transfer with delay-sensitive applications having real-time requirements including audio and video. These applications have traditionally been supported by different network technologies and the integration between the different networks have been limited and cumbersome. In the past, asynchronous communication has been provided by computer networks that are packet-switched and use store-and-forward techniques, like the Internet. Real-time synchronous communication, on the other hand, has been provided by circuit switched, time-division multiplexed telephone networks.

Circuit-switched networks have many attractive features. For example, the circuits are isolated from one another in the sense that traffic on one circuit is unaffected by activities on the other circuits. This makes it possible to provide guaranteed transfer quality with constant delay which often is suitable for applications with timing requirements. Furthermore, information that is related to data and control are separated in circuit-switched networks. Processing of control information only takes place when circuits are created or terminated and the actual data transfer can be performed without the need for processing the data stream and controlling any congestion. This allows large volumes of data to be transferred efficiently.

The static nature of ordinary circuit-switched networks often makes them inappropriate for certain types of information flows. Traditionally, the circuits have fixed capacity, long set-up delay and poor support for multi-cast. These shortcomings make it difficult to efficiently support, for example, computer communication in a circuit-switched network. This has motivated a search for alternative solutions and the predominant view is that the next generation of telecommunication networks should be cell-switched based on asynchronous transfer mode (ATM). Cells are small, fixed-size packets, so ATM is similar to packet-switching. This means that many of the weaknesses of packet-switching are also present in cell-switched networks, particularly in the area of providing guaranteed quality of service. Therefore, additional mechanisms, such as admission control, traffic regulation, scheduling of packets on links and resynchronization at the receiver are needed to integrate support for different kinds of information flows. One of the main concerns with packet and cell switched networks in general, and ATM in particular, is whether it is possible to provide and use these mechanisms in a cost-effective way.

Shared medium local area networks (LANs), such as CSMA/CD, token ring and FDDI, are used in the Internet as building blocks connected by routers or bridges. The combination of easy expansion, low incremental node cost and tolerance to faulty nodes has resulted in simple, flexible, and robust networks. Also, the shared medium facilitates an efficient application of new multi-cast protocols such as IP multi-cast.

A drawback of the shared medium that is used today is that it typically permits only a single terminal to transmit at any time, thereby not utilizing all network segments efficiently. A design that allows the capacity of the medium to be reused may be designed, but this is often at the cost of increased complexity in the high-speed access control hardware. Access control mechanisms for a shared medium also directly depend on the size of the network and are usually efficient only for local area environments.

As indicated earlier, the two main types of networks commonly used are connection oriented circuit-switched networks used for telephones and packet-switched networks without connections that are used for computers, as exemplified by the Internet. When a circuit-switched network is used for data communication, the circuits must remain open between bursts of information which is often a poor use of the network capacity. This problem arises because circuit management operations are slow compared to the dynamic variations in the user demand. Another source of overhead in conventional circuit-switched networks is the limitation of requiring symmetrical duplex channels which add 100% overhead to the network when the information flow is unidirectional. This constraint also makes multi-cast circuits inefficient and difficult to implement. Packet-switched networks, on the other hand, lack resource reservation and must add header information to each message before the transmission is made. Furthermore, any latency in the packet-switched networks cannot be accurately predicted and packets may even be lost due to buffer overflow or corrupted headers. The latter two factors make real-time service difficult to support in packet-switched networks. Congestion avoidance mechanisms can isolate information streams of different users. These designs are, however, limited to time scale operations that are comparable to the round-trip packet delay.

DTM is a broadband network architecture that combines many of the advantages of circuit-switching and packet-switching in that DTM is based on fast circuit-switching augmented with a dynamic reallocation of resources, good support for multi-cast channels and DTM has means for providing short access delay. The DTM architecture spans from medium access, including a synchronization scheme, up to routing and addressing of logical ports at the receiver. DTM is designed to support various types of information flows and can be used directly for application-to-application communication, or as a carrier network for other protocols such as ATM or IP (The Internet Protocol).

It has been shown that the signaling delay associated with the creation and termination of communication channels determines much of the efficiency of fast circuit-switching. DTM is designed to create channels fast, within a few hundreds of microseconds. DTM differs from burst switching in that information related to control and data are separated and DTM uses multi-cast, multi-rate, high capacity channels to support a variety of different classes of information flows. For example, it is possible to increase or decrease the allocated resources of an existing channel depending on the particular requirements of the user at the time. Even though a DTM network may have the potential of creating a channel for every message, this approach may not be suitable for all information flows. Rather, it is up to the user to decide whether to establish a channel per information burst or to keep the channel established even during idle periods.

The DTM concept uses channels as the communication abstraction. The DTM channels differ from telephone circuits in many ways. First, the establishment delay is short so that resources can be allocated/deallocated dynamically as fast as user requirements change. Second, the DTM channels are simplex to minimize the overhead when the communication is unidirectional. Third, the DTM channels offer multiple bit-rates to support large variations in user capacity requirements. Finally, the DTM channels are multi-cast to allow any number of destinations.

The DTM channels require no transfer of control information after a channel is established resulting in a very high utilization of network resources for large data transfers. The support of any real-time information flow is effective and there is no problems related to policing, congestion control or flow-control within the network. As mentioned earlier, the control information is separated from the data information which makes multi-cast less complex. The transmission delay is negligible (i.e., less than 125 μs) and there is virtually no potential for data loss caused by buffer overflow as in ATM. Bit-error rates depend on the underlying link technologies, and switches are simple and fast due to the strict reservation of resources at the channel setup.

The DTM topology may be structured as a ring which has the advantage of reducing the hardware requirement with 50% compared to dual bus structures. All nodes are able to communicate with each other on a ring topology by using only one optical fiber in contrast to a bus structure that always require at least two fibers in opposite direction to enable all the nodes to communicate with each other.

In practice, any topology may be subjected to failures such as fiber failure or node failure. In the past, certain failures in a ring topology have caused a significant decrease in performance. For example, if a fiber failure occurs in a FDDI dual ring structure, it is necessary to close down the damaged ring thus drastically reducing the capacity of the ring structure. It is desirable to develop a ring topology that is less sensitive to fiber and node failures.

The performance of the DTM dual ring structure of the present invention is relatively insensitive to fiber and node failures. More particularly, the dynamic synchronous transfer mode dual ring topology has two rings that operate in opposite fiber directions. Preferably, the dual rings have a plurality of common nodes. A first channel may be established in a first segment extending between a first and a second node, which means that time slots (or tokens) may be allocated between the nodes for that channel. In this way, information may be transmitted in the first channel from the first node to the second node. If a fiber failure occurs in the first segment, the second node is likely to first detect the fiber failure. The second node may then transmit a fiber failure message. It is then determined if the first channel extends across the fiber failure. If the first channel is affected by the fiber failure then a channel failure message may be transmitted and the first channel is terminated and all the tokens associated with the first segment are removed. If the first channel is not affected, the same time slots can continue to form the first channel. This means that only the channels that are affected by the fiber failure are terminated while the remaining channels on the ring topology may operate in a normal manner although there is a fiber failure on the ring topology.

DETAILED DESCRIPTION

Figure 1:
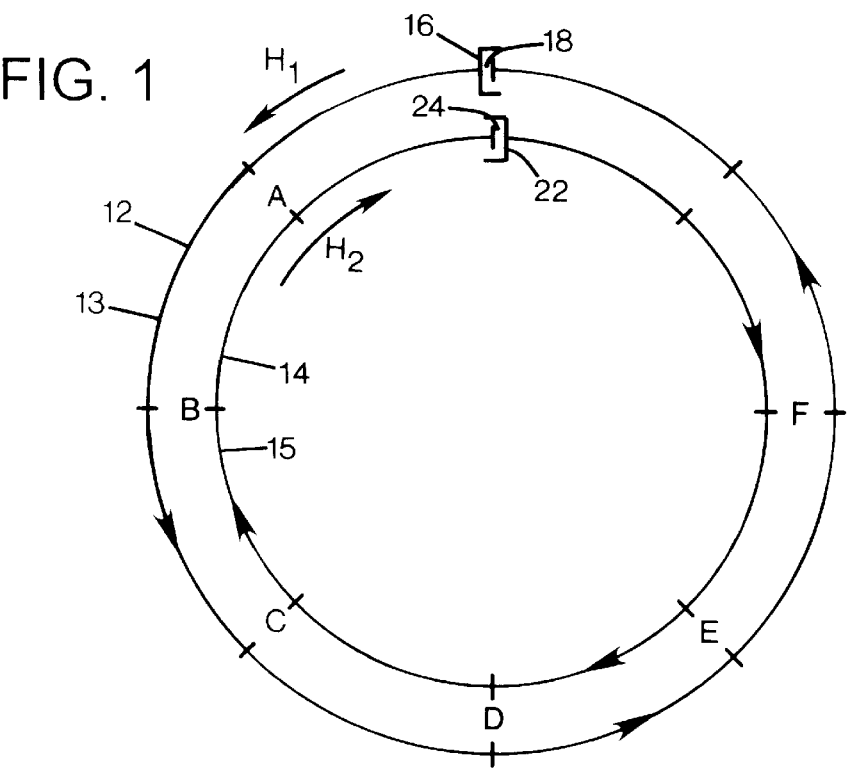
FIG. 1 is a schematic view of a dual DTM ring topology of the present invention.
Figure 2:
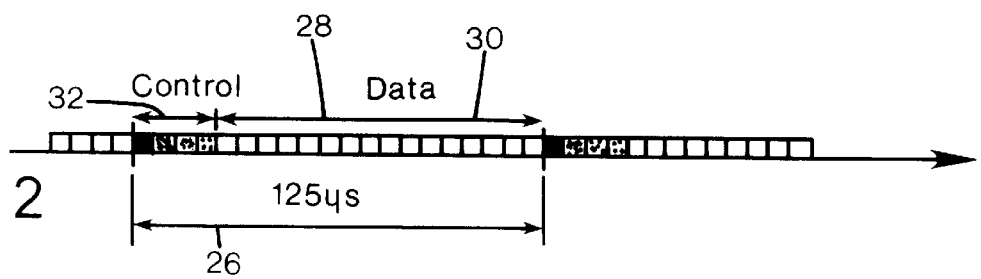
FIG. 2 is a schematic view of a DTM cycle of the present invention having the data time slots separated from the control time slots.

With reference to FIGS. 1–5, the present invention is a dynamic synchronous transfer mode (DTM) ring topology system 10 that has a first ring topology 12 and a second ring topology 14. The first ring topology 12 may be represented as an outer ring and the second ring topology 14 may represented as an inner ring in FIG. 1. The total capacity of the ring topologies 12, 14 may be divided into time cycles of 125 microseconds which are further dividable into 64-bit time slots.

One feature of the DTM ring topologies 12, 14 is that the cycle time and the slot length are, preferably, constant throughout the DTM ring topologies 12, 14. The DTM ring topologies 12, 14 are designed for a unidirectional medium with multiple access such as fiber optics medium 13, 15 having a capacity that is shared by all the connected nodes. The slots may be dynamically allocated between the nodes, as described in detail below. The transmission medium can, in addition to optical fibers, be a coaxial cable or another medium with high capacity. In the description, the transmission medium may be referred to as an optical fiber.

The first ring topology 12 may be adapted to transfer data in a first rotational direction, as shown by an arrow H1, such as in a counter-clockwise direction, and the second ring topology 14 may be adapted to transfer data in a second rotational direction, as shown by an arrow H2, such as in a clockwise direction. It is to be understood that the first rotational direction may be clockwise and the second rotational direction may be counter-clockwise as long as the first fiber direction is different from the second fiber direction. Both the first and second ring topologies 12, 14, preferably, have an effective length that is an integer multiple of 125 microseconds long cycles. As described in detail below, although the actual length of the ring topologies may not be an integer multiple of 125 microseconds, the effective length of the ring topologies may be adjusted with expansion nodes.

The first ring topology 12 may comprise an expansion node 16 that may be used to precisely adjust the effective length of the ring topology 12 although the physical length of the ring topology 12 is not an integer multiple of the cycle time. The expansion node 16 may include an expandable buffer segment such as a FIFO (first-in-first-out) queue 18 for storing incoming cycles of time slots. The queue 18 may permit a time expansion of the first ring topology 12 by storing incoming cycles in the queue 18 a suitable amount of time to optimize and synchronize the use of the expansion node 16 by permitting the expansion node 16 to generate cycles periodically (every 125 microseconds) into the ring topology independent of the availability of any incoming cycles in the FIFO queue 18 at the transmission time of the new cycle.

The first ring topology 12 preferably has a plurality of nodes A–G and at least one of the nodes is selected as the expansion node 16. Because the two ring topologies have opposite fiber directions, node A may be the first node of the ring topology 12 and the eighth node in the ring topology 14. Similarly, node B may be the second node of the ring topology 12 and the seventh node of the ring topology 14. The method of selecting the expansion node 16 may be performed according to a suitable selection method such as selecting the node that has the highest or the lowest predetermined identification number.

Similarly, the second ring topology 14 preferably comprises an expansion node 22 that may be used to precisely adjust the effective length of the second ring topology 14. The expansion node 22 may also include an expandable FIFO queue 24 to optimize the use of the expansion node 22 and to properly synchronize the incoming cycles with the expansion node 22. The second ring topology 14 preferably shares the nodes A–G with the first ring topology 12 although the fiber direction of the second ring topology 14 is opposite that of the fiber direction of the first ring topology 12.

In general, the service provided by the DTM ring topologies 12, 14 of the present invention are, preferably, based on channels. A channel may be defined as a set of time slots having a sender and an arbitrary number of receivers that guarantees that the information data will reach the receivers at the rate given by the capacity of the channel. The channels on the physically shared medium may be illustrated by a time division multiplexing (TDM) scheme (see FIG. 2). The total capacity of the channels may be divided into time cycles 26 having a length of 125 microseconds that are further dividable into 64-bit time slots 28. It is to be understood that other cycles and slot sizes may be used.

The time slots 28 are preferably separated into data slots 30 and control slots 32. As described in detail below, each node A–G and each expansion node 16, 22 has access to at least one control slot 32 associated therewith that may be used for sending control information to the other nodes in the ring topologies 12, 14. For example, control messages may be sent upon a request from a user and in response to control messages from other nodes or simultaneously for management purposes. The control slots 32 may constitute a small fraction of the total capacity while the major part of the slots are, preferably, data slots 30 for carrying payload.

All the connected nodes A–G and the expansion nodes 16, 22 in the ring topologies 12, 14 share all the available data slots. An important feature of the DTM concept is the time division multiplexing scheme illustrated in FIG. 2. The position of a particular set of slots in the cycles may be used to determine which of the nodes have access to the particular set of slots. In other words, a data slot is always owned by exactly one node at a particular time and only the owner of a data slot at a particular time may use the data slot to send and receive information. In this way, the position of the slots in the cycle may be used to determine which node is going to use the data slots and there is no need to include a header in the message.

Figure 3:
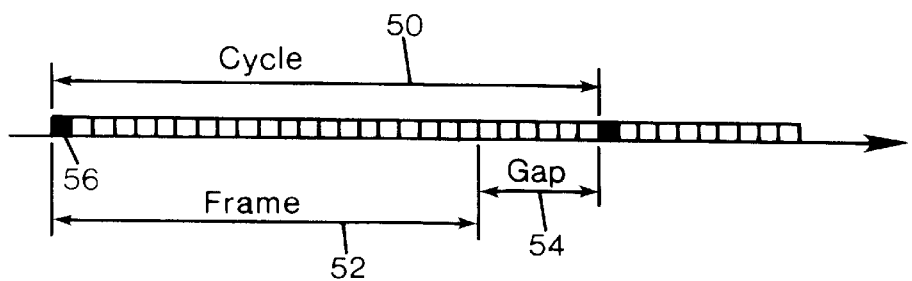
FIG. 3 a schematic view of a DTM cycle including a frame and gap slots.

FIG. 3 illustrates the details of a complete time cycle 50 that may be defined as an integer number of time slots corresponding to about 125 microseconds. The cycle 50 may be divided into a frame 52 and gap slots 54. The frame 52 may be used to include data slots for carrying pay loads and control slot s for carrying control and management messages. It is necessary to include the gap slots 54 in each cycle 50 because each node in the ring topology 10 may not be perfectly synchronized to 125 microseconds and the gap slots 54 may be used to accommodate any variations between the nodes. The gap slots 54 are preferably never used to carry payloads but are only used as an adjustment mechanism. The number of gap slots 54 may be adjusted up or down a few slots so that the average cycle time is very close to 125 microseconds.

In the preferred embodiment, the frame 52 may also include a start slot 56 that is disposed in the beginning of the frame 52 to define the start of a new cycle. In this way, the frame 52 is a fixed number of slots that is slightly less than the total number of slots in the cycle 50.

However, a node may dynamically allocate resources to another node in the ring topologies such as by dynamically allocating a data slot or a set of data slots to another node if the other node needs more slots to fulfill a request. In this way, the ownership of the data slots may vary and is negotiated between the nodes through the control slots 32. In each network node, there may be a node controller that controls the access to the data slots and performs network management operations, such as network start-up and error recovery. The main tasks of the node controller are to create and terminate channels on demand from users and to manage network resources in response to user requests. Preferably, control slots are used exclusively for messages between node controllers. As mentioned earlier, each node controller has write access to at least one control slot in each cycle which the node controller may use to broadcast control messages to nodes that are downstream thereof. Since write access to control slots is exclusive, the node controller should always have access to its control slot or control slots regardless of other nodes and the load on the ring system 10.

As mentioned earlier, the majority of the slots in a cycle are, preferably, data slots. Access to data slots may change over time depending on the requirements of the users connected to the nodes in the ring system 10. Write access to the slots may be controlled by slot tokens (or tokens for short) that may be kept in a token pool. Preferably, the node controllers may write data into a slot only if it owns the corresponding token. The token protocol may guarantee the slot access to be conflict free, which means that not more than one node may write data into the same slot.

Figure 4:
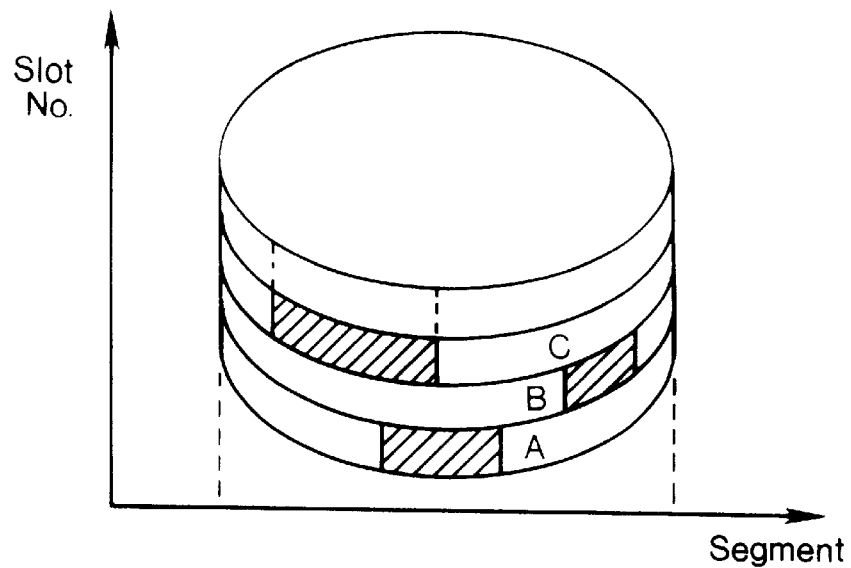
FIG. 4 is a schematic view of a ring topology showing three separate channels.

A set of status messages may be used to distribute information about the pool of free tokens available among the nodes in the ring topologies 12, 14. For example, as shown in FIG. 4, the pool of free tokens may be represented by the peripheral surface of the cylinder where the length of the cylinder may represent the number of slots and the periphery of the cylinder may represent the number of nodes disposed between segments. The status message information may be used to assist a node to determine the availability of free tokens when there is a need to have slots dynamically allocated from another node. Each node may regularly broadcast status information about how many free tokens the node has. The other nodes may store this information in their status tables. In this way, a node that requires more capacity may simply consult its status table to decide from which node to request more slots. The broadcast status information provides an approximate view of the current state of token information so that token requests may be rejected if a token request is sent to a node that no longer has any tokens to give away.

As mentioned earlier, the DTM system of the present invention may permit a multiple access to the data slots depending upon which node has been allocated the slots according to the allocation system used in the ring topology system 10. According to the DTM protocol, when the expansion nodes 16, 22 and nodes A–G in the ring topologies 12, 14 read the slots of a cycle transmitted by or received from a preceding node, including the expansion nodes 16, 22, the nodes may either copy the information of the slots and send the information to the local user of the particular node and transmit the same information to the next node in the ring topologies 12, 14.

If a slot reuse method is used, the nodes A–G and the expansion nodes 16, 22 may also read and copy the information of the slots and send the copied information to the local user and then change the information or write new information into the slots before the information is forwarded to the next node of course, the nodes may neither read or copy the information of a particular node.

As noted above, one important feature of the present invention is that the cycle time is preferably constant to maintain the synchronization of the entire ring topology system 10. Additionally, each cycle has a constant number of slots although each slot in every cycle may or may not contain any information. It is also important to note that it is possible to increase the bitrate per seconds in the fiber optics 13, 15 thereby increasing the number of slots per cycle without losing the synchronization of the ring topologies 12, 14 of the network. It is even possible to connect two DTM networks together that operate at different speeds, and the synchronization may be maintained if the cycle time and slot length are constant.

If a slot reuse method is used, a single slot may be used multiple times on the ring topologies. Slot reuse enables transmissions in the same slot by different users in separate segments of the ring topologies 12, 14. Slot reuse may be described as a general method to better utilize shared links in the ring topologies 12, 14.

The fact that the first DTM ring topology 12 has a fiber direction that is opposite the fiber direction of the second DTM ring topology 14 improves the capacity of the ring topology system 10. The capacity of the system 10 depends partly on the bitrate per second of the particular fiber optics used. For example, the bitrate per second may be a fixed value such as 10 billion bits per second. Of course, the bitrate per second may be a higher value or a lower value. The higher the bitrate of the fiber optics the more slots per 125 microseconds cycle. As explained in detail below, the actual throughput of the ring topology system 10 may be higher than the bitrate of the fiber optics 13, 15 by reusing slots in the ring topologies 12, 14 in certain segments of the ring topologies. In other words, the same slots may be used by different users in different segments of the ring topologies so that a slot may be used more than once. However, the number of slots per cycle does not increase only the number of times the slots are used if the number of slots required exceeds the number of slots in the cycle.

Assuming that both the ring topologies 12, 14 have the same fiber direction, the total capacity of the system 10 may be described as the bitrate of ring topology 12 in addition to the bitrate of the ring topology 14, i.e., the total bitrate is twice as high as the bitrate of only one of the ring topologies.

By providing the ring topologies 12, 14 with fiber directions that are opposite to one another, the average distance a time slot must travel from a source node to a destination node is reduced to half the statistical average distance of a single ring topology 12. The average travel distance in a single ring topology or a dual ring topology, with the same fiber direction, is half the ring circumference while the average travel distance in a dual ring topology having opposite fiber directions is only one quarter of the ring circumference. By reducing the average distance, the total capacity of dual rings with opposite fiber direction is increased to be twice as high as the total capacity of a dual ring where both rings have the same fiber direction.

In other words, a ring topology may provide a capacity that is twice as high as the capacity of a conventional dual bus topology because any source node in the ring topology can reach any destination node. In contrast, a bus topology requires at least two buses, one in each direction, to enable any source node to reach any destination node in the bus topology. As mentioned earlier, a dual ring topology system that has the same fiber direction provides a capacity that is twice as high as the capacity of a single ring topology. A dual ring topology with opposite fiber directions provides a capacity that is twice as high as the capacity of a dual ring topology with the same fiber direction. Therefore, the total capacity of a dual ring topology that has opposite fiber directions may be described as providing a capacity that is eight times higher than the capacity of a conventional bus topology.

As mentioned above, the expansion nodes 16, 22 or any other node A–G in the ring topology system 10 may create a channel by allocating a set of data slots for the channel and by sending a channel establishment control message. The control message may be addressed either to a single node or to a multi-cast group and announces that the channel has been created and what slots are used.

Control messages for the channel establishment and bandwidth reallocation may carry sets of tokens as parameters. However, a control message is, preferably, 64 bits and can therefore have only a small number of parameters. This means that if a user requests a large bandwidth transfer, it may be necessary to send several control messages to create the channel. This may introduce extra access delay and require additional signaling capacity. Several mechanisms have been considered to reduce the amount of information that needs to be sent during the channel creation and token reallocation procedures.

In the preferred embodiment, the first optimization in token management may be to introduce block tokens so that one token may be used to represent a block of available contiguous slots in the free token pool. A block token may be transferred in a single control message and represent a group of tokens but can only be used for particular combinations of tokens. For instance, a block token may be denoted by a slot number and the number of contiguous slots in the group. The block token optimization assumes that the token pool is not fragmented into small pieces. Too many small token blocks in the free pool may be a problem and referred to as fragmentation.

A block token may represent a number of available slots that can be adjoined to form a block. The slots may extend both in the segment and the slot number dimensions. The size of a block token may be measured by the length of the block in the segment and in the slot number directions. The process for selecting suitable block token format may be designed so that, whenever possible, a block token is selected that has the smallest overall size but that satisfies the requirements of a new channel i.e. that the block token provide sufficient tokens from the source node to the destination nodes of the channel. However, if there are several suitable block tokens available that have the same size, the selection process may select the block token that has the longest length in the segment direction. The length in the slot number direction is only of secondary importance. When using the slot reuse method in DTM ring systems, the block token format may be extended to include parameters describing the segments the block token is representing. The token management protocol may also be modified to avoid conflicts in the slot number dimension as well as the segment dimension.

Figure 5:
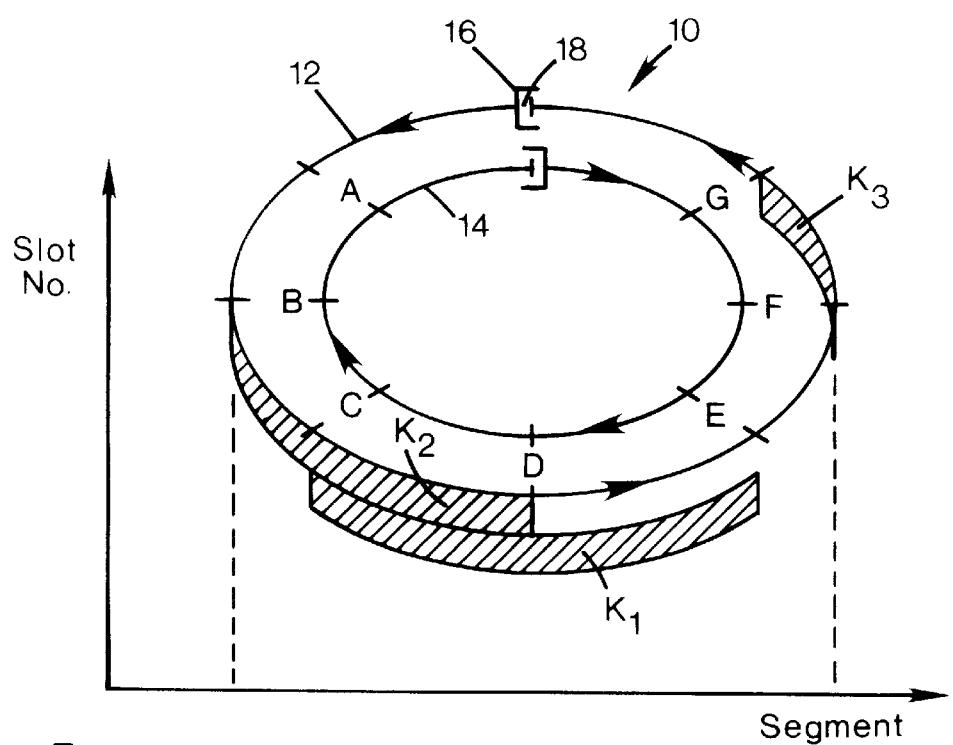
FIG. 5 is a schematic view of the position of two separate DTM channels relative to ring nodes and slot numbers.

The token protocol may guarantee that a data slot can never be used by two nodes simultaneously on the ring topology system 10. Sometimes this protocol is too conservative. FIG. 4 illustrates an example of how tokens are reserved for three channels (A, B, and C). The nodes are connected by segments and the channels typically use a subset of the segments on the ring structure (gray color) and the rest may be reserved (white color) but left unused and thus wasting shared resources. A better alternative is to only reserve capacity on the segments between the sender and the receiver as the example illustrated in FIG. 5. More particularly, FIG. 5 shows three channels K1, K2, and K3. A single slot or slot sections may in this case be used multiple times on the ring topology. In the illustrated example, channel K2 is using the same slots as channel K3 but on different segments in the ring topology 12. As indicated earlier, this may be referred to as slot reuse. Slot reuse enables simultaneous transmissions in the same slot over disjointed segments of the ring topology system 10. Because the ring topology is round, it is also possible to reserve slots from the end node to the start node, such as from node G to node A. This is an added feature of ring structures that is not available in single or dual straight bus topologies.

Figure 6:
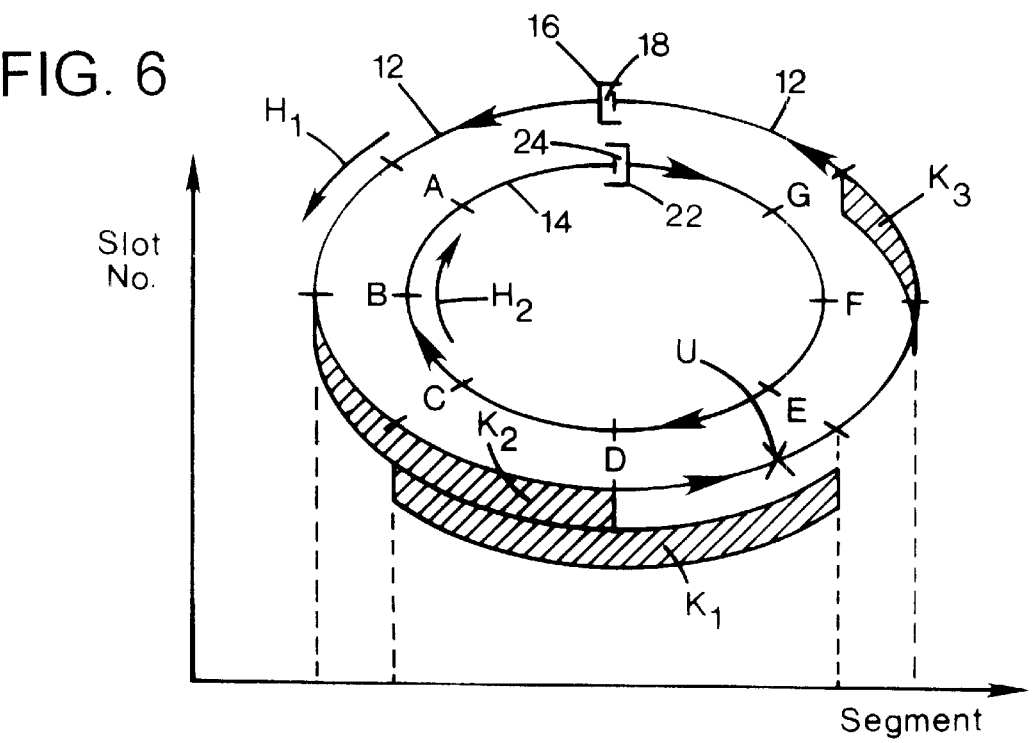
FIG. 6 is a schematic view of a dual DTM ring topology having a ring failure on the outer ring.

FIGS. 6–9 illustrate a variety of situations where there are fiber or node failures in one or both ring topologies 12, 14. FIG. 6 shows a single failure U disposed between node D and node E on the outer ring topology 12. The failure U is likely to be first detected by node E on the ring topology 12 because node E is situated immediately downstream of the failure U in the fiber direction H1. Node E may detect that there is a failure preceding node E if node E does not receive any slots from node D within a certain time period. In other words, node E only knows that the failure must have occurred before node E but not exactly where on the ring topology 12. Node E may then inform all the nodes on the ring topology 12 about the failure U by either sending fiber failure messages on the outer ring topology 12 in the counter clockwise direction or by sending fiber failure messages on the inner ring topology 14 in the clockwise direction H2.

After all the nodes receives the information from node E about the fiber failure U, each node may review its channel table to determine if any of the channels transmitted by the particular node is affected by the failure U. In the above example, the failure U only affects channel K1 that extends from the source node C to the destination node E on the outer ring topology 12. Node C may send a control message about the failed channel to the destination node E by using the inner ring topology 14 and transmit in the opposite clockwise direction until the channel failure message reaches the destination node E. These types of messages may be transmitted by the node controller of the node C. Node E may then continue transmitting cycles as a master node in a normal fashion if node E has a slot generator.

The next step may be to remove all the tokens that are associated with the segment between node D and node E on the damaged outer ring topology 12. In other words, all tokens for the full bandwidth between nodes D and E on the outer ring topology 12 may be removed and made unavailable to all the nodes. There is no need to have a complicated control mechanism to keep track of where in the system the failure has occurred. It is sufficient to simply make the particular tokens associated with the segment unavailable to all the nodes in the ring topology system 10.

There is essentially no difference between the occurrence of a fiber failure between nodes D and E on the outer ring topology 12 and using all the tokens for the segments between the nodes D and E for a channel because the tokens are unavailable in either situation. All the other channels on the outer ring topology 12 that are not using the defective segment may continue to operate in a normal way. In other words, although the outer ring topology 12 includes a permanent failure U, the ring topology 12 is still fully functional except for the unavailability of the tokens for the segment that is affected by the fiber failure U. The more nodes and the fewer channels the ring topology 12 has the less likelihood that the fiber failure is going to affect a particular channel. Any future channel that normally would use the segment between nodes D and E on the outer ring topology 12 must now use the inner ring topology 14.

Channel K2 that extends from node B to node D and channel K3 that extends from node F to node G on the outer ring topology 12 are completely unaffected. Any future channels that are set up on the outer ring topology 12 will be completely unaffected by the fiber failure U as long as the channels do not require tokens for the segment that extends between node D and node E. Even if a channel requires the segment between the node D and the node E, the inner ring topology 14 may still be used.

Because all the tokens for the segment between nodes D and E are removed from the pool of free tokens for the outer ring topology 12, the average size of the block tokens for the outer ring topology 12 is likely to be smaller than the average size of the block tokens for the inner ring topology 14. The source node of a channel may then compare the smallest possible block token available on the outer ring topology 12 that will satisfy the requirements of the channel with the smallest possible block token available on the inner ring topology 14 that will also satisfy the channel requirements. This may mean that the utilization of the damaged outer ring topology 12 is maximized while as much free capacity as possible is maintained on the inner ring topology 14 because the block tokens are likely to be smaller on the outer ring topology 12 due to the fiber failure.

If there is a single fiber failure on the outer ring topology 12, the ring topology 14 still has a capacity that is at least two times that of conventional bus topology due to the slot reuse method and the ring structure itself, as indicated above. In addition, because the ring topology 12 may still be used, except for the segment between nodes D and E, the ring topology 12 adds additional capacity to the ring topology system 10. When both ring topologies 12, 14 are fully functional, the ring topology system 10 provides a capacity that is about 8 times higher than a conventional bus topology. This means that the capacity of ring topology system 10 that has a single fiber failure provides a capacity that is between 2 and 8 times higher than a conventional bus topology. The exact capacity of the system 10 with one fiber failure depends partly on the number of channels that use the damaged segment.

Figure 7:
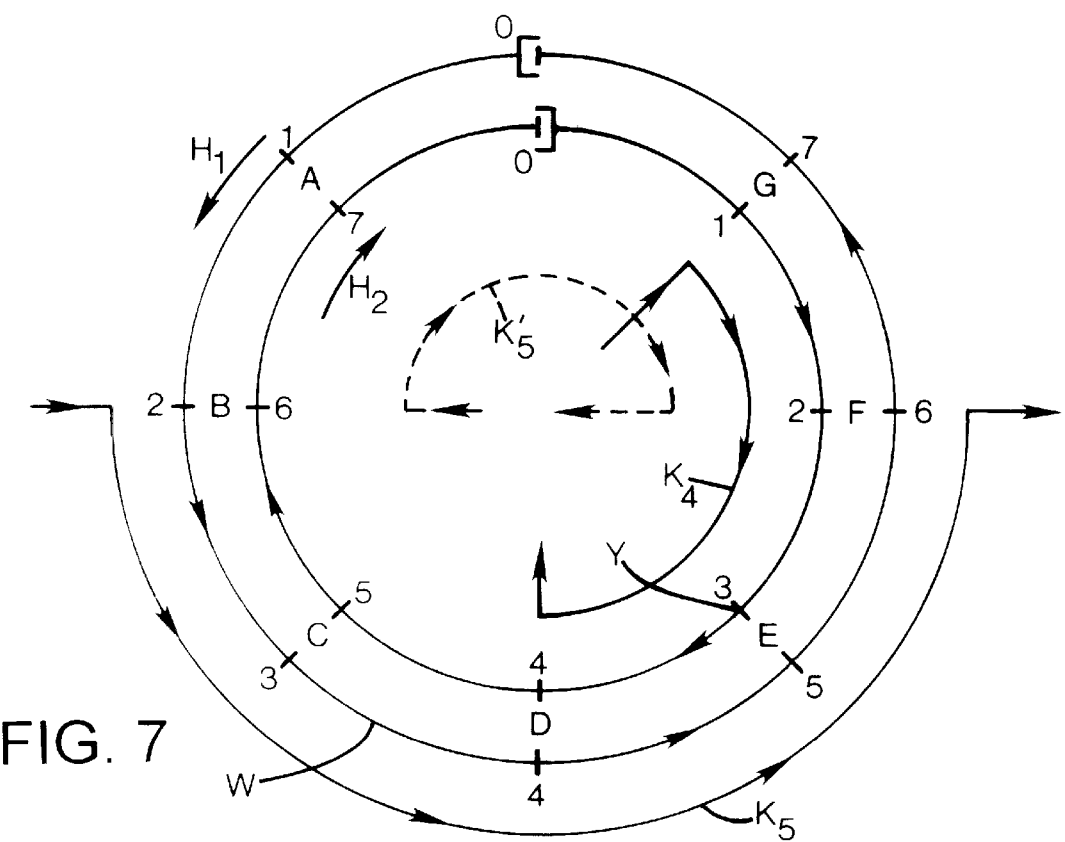
FIG. 7 is a schematic view of a dual DTM ring topology having ring failure on both the outer and the inner rings in different segments.

FIG. 7 illustrates an example when both the ring topology 12 and the ring topology 14 each has a fiber failure but in different segments of the ring topologies. For example, the outer ring topology 12 may have a fiber failure W situated between nodes C and D and the inner ring topology 14 may have a node failure Y in node E. If there is a channel K4 that extends from node G to node D on the inner ring topology 14 and a channel K5 that extends from node B to node F on the ring topology 12 both channels K4 and K5 are affected. Channel K4 is affected by the fiber failure W and channel K5 is affected by the node failure Y. In this situation, node D will first detect the failure W and node F will first detect the node failure Y in node E.

Node D may then transmit a fiber failure message to the other nodes. Because channel K5 has been affected by the fiber failure W, the source node B may then transmit a channel failure message to the other node. The channel K5 may then be terminated and the tokens for the segment between node C and node D may be made unavailable on the outer ring topology 12 so that future channels do not include the segment between node C and node D. If it is essential to maintain the channel between the source node B and the destination node F, node B may set up an alternative channel K5' between the source node B and the destination node F by using the inner ring topology 14 and transmit via node A, expansion node 22 and node G to the destination node F.

Figure 8:
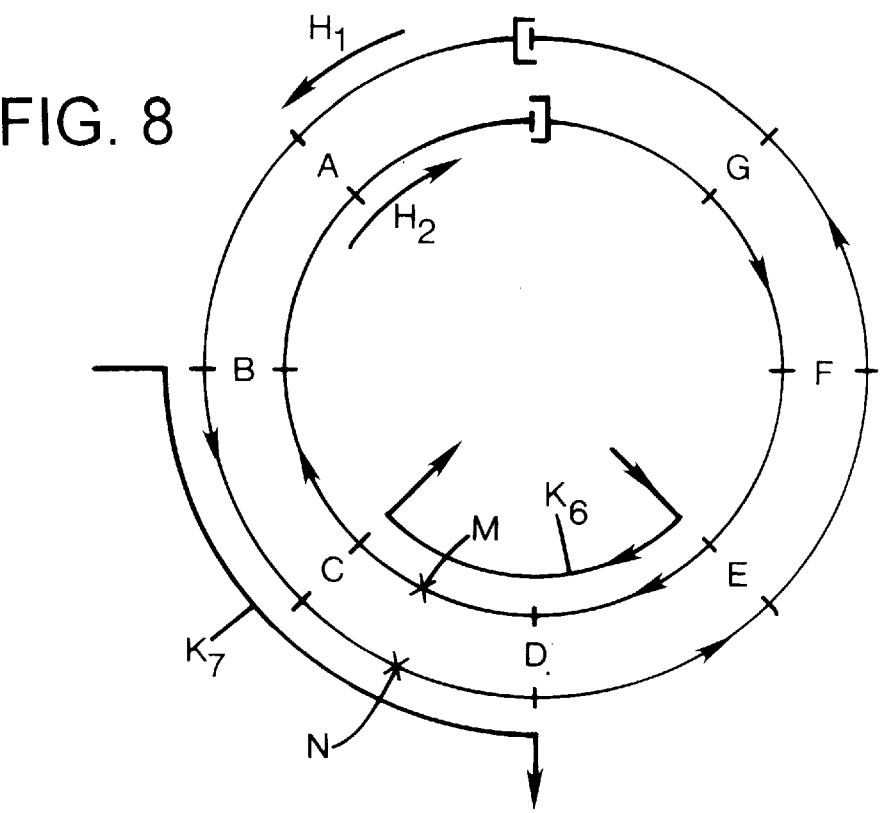
FIG. 8 is a schematic view of a dual DTM ring topology having ring failure on both the outer and the inner rings in the same segment.

FIG. 8 illustrates a situation when both the outer and the inner ring topologies 12, 14 have fiber failures M and N in the same segment between nodes C and D. More particularly, the fiber failure M is first detected by node C on the inner ring topology 14 and the fiber failure N is first detected by node D on the outer ring topology 12. Node C will inform all the nodes that are downstream of node C on the inner ring topology 14 about the fiber failure M and node D will inform all the downstream nodes on the outer ring topology 12 about the fiber failure N. Both node C and node D may continued to generate cycles a master nodes, if so desired. All the nodes then determine which channels are affected by the fiber failures M and N. This determination may be done by all the nodes at the same time in parallel. If a channel is affected by the fiber failure, the source node may send a channel failure message to the destination node. In the example illustrated in FIG. 8, channels K6 and K7 are affected and node C cannot use the outer ring topology 12 to inform the source node E about the fiber failure M due to the fiber failure N on the outer ring topology. However, node C may send a message the long way on the inner ring topology 14 passed the expansion node 22 and eventually reach node E. Similarly, node D on the outer ring topology 12 must use the outer ring topology 12 to send a message to the source node B about the fiber failure N that affects the channel K7.

All tokens for the segment between node C and node D on both the ring topologies 12 are then made unavailable and the ring topologies 12, 14 will essentially function as a dual bus structure with node C and node D as end nodes. Also, the total capacity of the ring topology system in this case is identical to that of a dual bus topology that is two times higher than a single bus topology.

Figure 9:
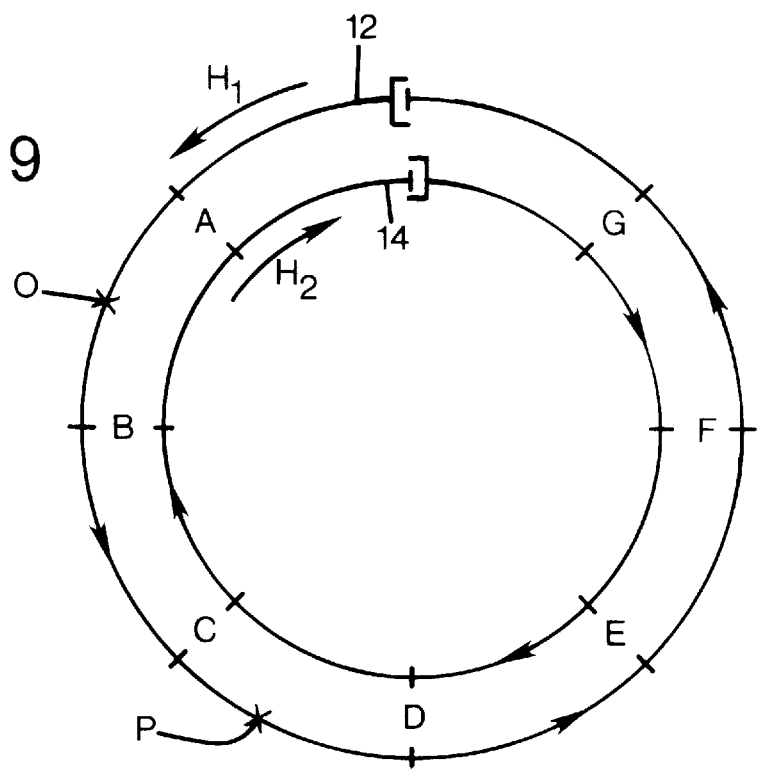
FIG. 9 is a schematic view of a dual DTM ring topology having two ring failures on the outer ring.

FIG. 9 illustrates a situation when the outer ring topology 12 has two fiber failure while the inner ring topology 14 has no fiber failure. For example, the outer ring topology 12 may have a fiber failure O between nodes A and B and a fiber failure P between the nodes C and D. Because the inner ring topology 14 is fully functioning, the inner ring topology may be used to send control messages to all the nodes to inform all the nodes about the fiber failures O and P. The procedure of informing the nodes in the ring system 10 is analogous to the procedures described above. Nodes B and D may act as master nodes and keep on generating cycles as soon as possible after the detection of the fiber failures O and A.

While the present invention has been described with reference to preferred embodiments, it is to be understood that certain substitutions and alterations may be made thereto without departing from the spirit and scope of the invention as set forth in the appended claims.

We claim:

1. A method of managing a failure on a dynamic synchronous transfer mode dual ring topology, comprising the steps of;

providing a first dynamic synchronous transfer mode ring topology having a first node, a second node and a third node, the first ring topology using time division multiplexing having a capacity that is divided into time cycles that are dividable into time slots, the first topology being adapted to transmit frames only in a first fiber direction;

providing a second dynamic synchronous transfer mode ring topology having the first node and the second node in common with the first ring topology, the second ring topology being adapted to transmit frames only in a second fiber direction that is opposite the first fiber direction;

establishing a first channel in a first segment on the second ring topology extending between the first and second node, the second node being downstream of the first node;

providing tokens associated with the first channel;

transmitting information in the time slots forming the first channel;

the second node detecting a fiber failure in the first segment on the second ring topology;

the second node transmitting a fiber failure message;

determining if the first channel extends across the fiber failure;

if the first channel extends across the fiber failure, transmitting a channel failure message, terminating the first channel and removing all tokens associated with the first segment; and if the first channel does not extend across the fiber failure, continuing transmitting information in the time slots forming the first channel on the second ring topology.

2. The method according to claim 1 wherein the method further comprises the step of forming a plurality of block tokens from contiguous tokens and the step of establishing the first channel further comprises the step of selecting a block token associated with the first segment.

3. The method according to claim 2 wherein the method further comprises the step of providing a plurality of block tokens having a variety of sizes and the step of selecting the block token further comprises the step of selecting a block token with a minimum size.

4. The method according to claim 3 wherein the step of selecting the block token further comprises the step of reviewing block tokens on both the first ring topology and the second ring topology.

5. The method according to claim 3 wherein the step of selecting further comprises providing a first block token having a first areal size and a first length and a second block token having a second areal size and a second length, the first areal size and the second areal size have an identical value, selecting the first block token if the second length is greater than the first length and selecting the second block token if the first length is greater than the second length.

6. A method of managing a failure on a dynamic synchronous transfer mode dual ring topology, comprising the steps of:

providing a first dynamic synchronous transfer mode ring topology having a first node, a second node and a third node, the first ring topology using time division multiplexing having a capacity that is divided into time cycles that are dividable into time slots, the first topology being adapted to transmit frames only in a first fiber direction;

providing a second dynamic synchronous transfer mode ring topology having the first node and the second node in common with the first ring topology, the second ring topology being adapted to transmit frames only in a second fiber direction that is opposite the first fiber direction;

detecting a failure between the first node and the second node on the second ring topology; and transmitting information in time slots from the second node to the third node on the second ring topology.

7. The method according to claim 6 wherein the method further comprises the step of transmitting information in time slots from the third node to the first node on the second ring topology.

8. The method according to claim 6 wherein the method further comprises the step of transmitting information in time slots from the first node to the second node on the first ring topology.

9. A method of handling a failure on a dynamic synchronous transfer mode dual ring topology, comprising the steps of:

providing a first dynamic synchronous transfer mode ring topology having a first node, a second node and a third node, the first ring topology using time division multiplexing having a capacity that is divided into time cycles that are dividable into time slots, the first topology being adapted to transmit frames only in a first fiber direction;

providing a second dynamic synchronous transfer mode ring topology having the first node and the second node in common with the first ring topology, the second ring topology being adapted to transmit frames only in a second fiber direction that is opposite the first fiber direction;

detecting a first failure between the first node and the second node on the first ring topology;

detecting a second failure between the first node and the second node on the second ring topology;

transmitting information in time slots from the first node to the second node on the first ring topology; and transmitting information in time slots from the second node to the first node on the second ring topology.

10. The method according to claim 9 wherein the method further comprises the steps of establishing a channel between the first node and the second node on the first ring topology and providing tokens for the channel.

11. The method according to claim 10 wherein the method further comprises the step of forming a plurality of block tokens from contiguous tokens and the step of establishing the channel further comprises the step of selecting a block token associated with the channel.

12. The method according to claim 11 wherein the method further comprises the step of providing a plurality of block tokens having a variety of sizes and the step of selecting the block token further comprises the step of selecting a block token with a minimum size.

13. The method according to claim 12 wherein the step of selecting the block token further comprises the step of reviewing block tokens on both the first ring topology and the second ring topology.

14. The method according to claim 12 wherein providing a first block token having a first areal size and a first length and a second block token having a second areal size and a second length, the first areal size and the second areal size have an identical value, selecting the first block token if the first length is greater than the second length and selecting the second block token if the second length is greater than the first length.

15. The method according to claim 10 wherein the method further comprises the step of determining if the channel extends across the first failure.

16. The method according to claim 15 wherein the step of determining further comprises the step of transmitting a channel failure message if the channel extends over the first failure.

17. The method according to claim 16 wherein the step of transmitting further comprises the step of terminating the channel.

18. A method of handling a failure on a dynamic synchronous transfer mode dual ring topology, comprising the steps of:

providing a first dynamic synchronous transfer mode ring topology having a first node, a second node and a third node, the first ring topology using time division multiplexing having a capacity that is divided into time cycles that are dividable into time slots, the first topology being adapted to transmit frames only in a first fiber direction;

providing a second dynamic synchronous transfer mode ring topology having the first node and the second node in common with the first ring topology, the second ring topology being adapted to transmit frames only in a second fiber direction that is opposite the first fiber direction;

detecting a first failure between the first node and the second node on the second ring topology;

detecting a second failure between the second node and the third node on the second ring topology; and transmitting information in time slots from the third node to the first node on the second ring topology.

19. The method according to claim 18 wherein the method further comprises the steps of detecting the first failure further comprises the step of transmitting a first failure message.

20. The method according to claim 18 wherein the method further comprises the steps of detecting the second failure further comprises the step of transmitting a second failure message.

* * * * *